UNITED STATES PATENT OFFICE.

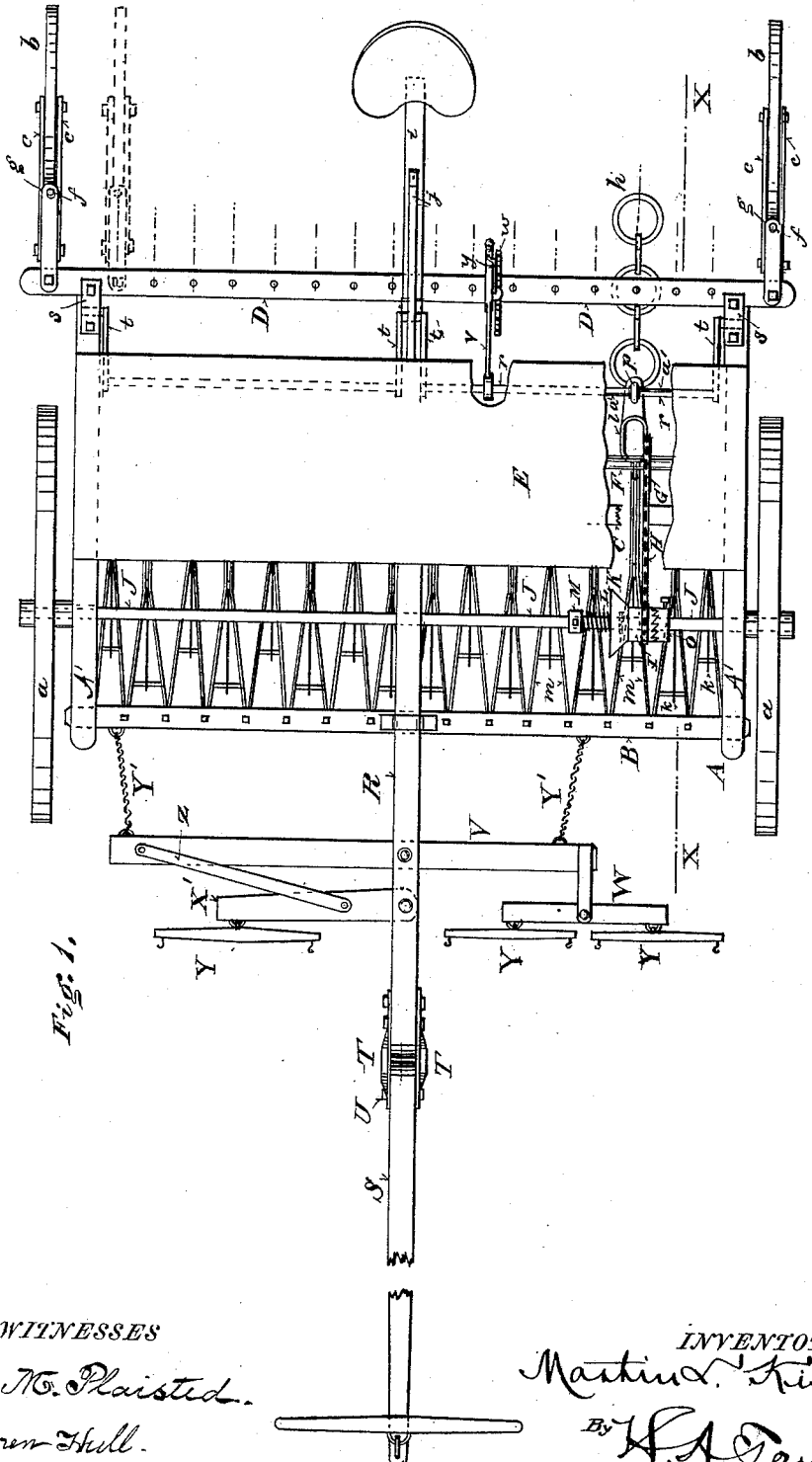

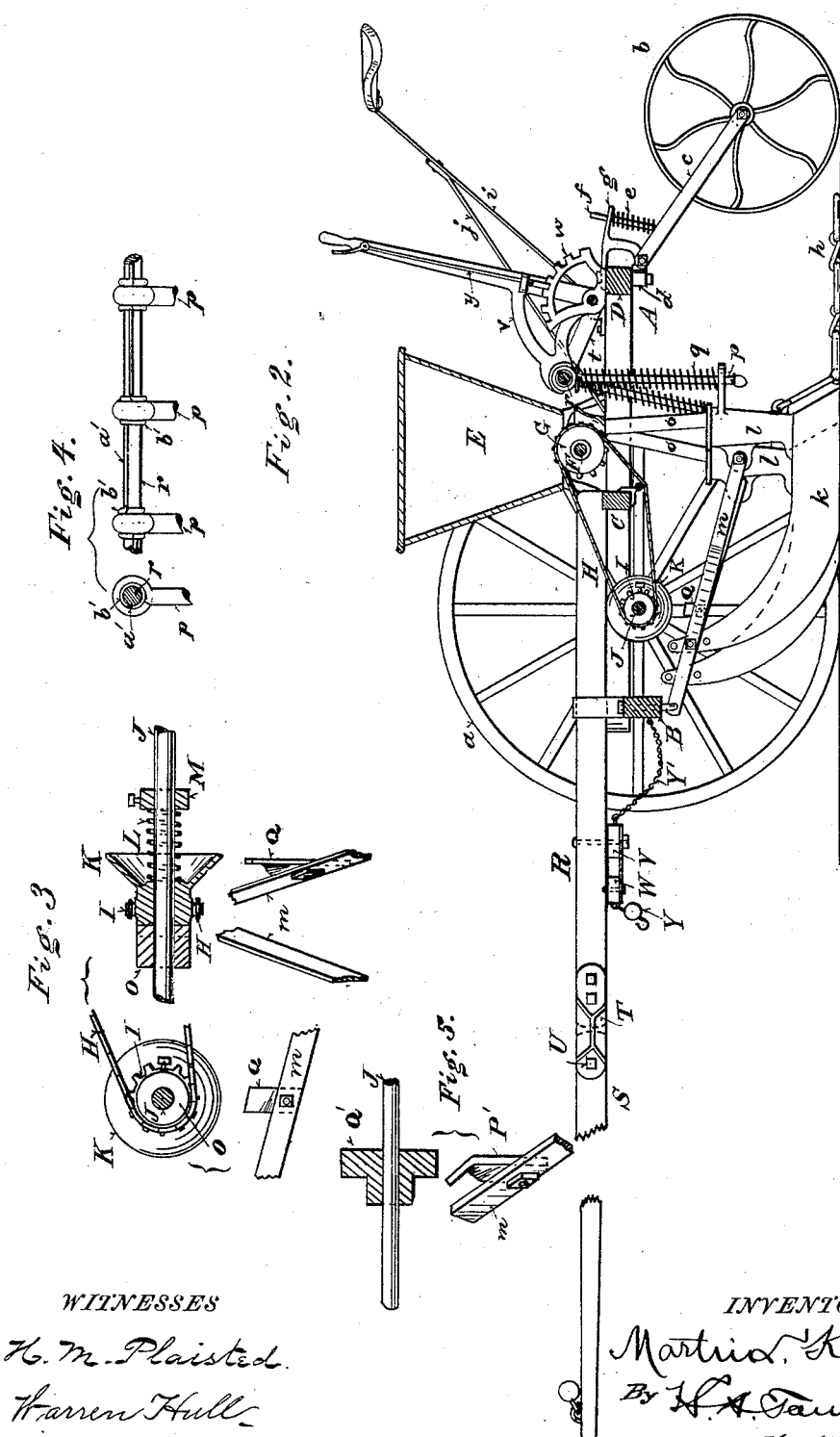

MARTIN L. KISSELL, OF SPRINGFIELD, OHIO, ASSIGNOR TO THE P. P. MAST & COMPANY, OF SAME PLACE.

GRAIN-DRILL.

SPECIFICATION forming part of Letters Patent No. 422,229, dated February 25, 1890.

Application filed August 29, 1889. Serial No. 322,314. (No model.)

*To all whom it may concern:*

Be it known that I, MARTIN L. KISSELL, a citizen of the United States, residing at Springfield, in the county of Clark and State of Ohio, have invented certain new and useful Improvements in Grain-Drills, of which the following is a specification, reference being had therein to the accompanying drawings.

This invention relates to certain new and useful improvements in grain-drills; and the improvements have reference to providing for a jointed draft-pole by a suitable distribution of the weight of the machine upon or between the main or driving wheels, and certain auxiliary or supporting wheels, whereby the animals will be relieved of the excessive weight or strains on their necks, and yet the machine be properly sustained with respect to the ground and under easy control; have reference to combining in one wheel the function of an auxiliary or supporting wheel, and the function of a coverer at the rear of the runners, whereby the machine will be adapted to packing light loose soil, as also the soil in localities subject to high winds and storms which blow the soil up and uncover the grain, at the same time that the feature of the jointed pole is preserved; have reference to an improved means of automatically stopping the feeder-shaft by the act of raising the runners from the ground, whereby the feed may be cut off as the runners are discontinued in their operation; have reference to a simple and inexpensive spacing device between the runner-elevating rods on their suspending-shaft, and have reference to certain details hereinafter more fully described, and pointed out in the claims.

In the accompanying drawings, forming a part of this specification, and in which like reference-letters indicate corresponding parts, Figure 1 represents a plan view of my improved machine with auxiliary supporting-wheels placed in position to perform the supporting function only; Fig. 2, a vertical sectional view of the machine on the line $x\,x$ of Fig. 1; Fig. 3, detail sectional side and rear views of the axle-operating devices; Fig. 4, a sectional and rear elevation of the suspending-shaft and the elevating-rods, and Fig. 5 a similar view to Fig. 3, showing the axle-operating devices.

The letter A designates a rectangular frame composed of side A′ and cross-bars B, C, and D. Upon this frame is mounted a hopper E of the usual construction, and running lengthwise of the hopper is the feeder-shaft F, which carries a number of feeders of any approved type. (None are illustrated.) This shaft also carries a sprocket-pinion G, by which it receives motion through a sprocket-chain H, operated by a sprocket-pinion I on the axle J of the machine. This latter pinion is connected to or formed with a conical flange K, as seen in Figs. 1 and 3, and a spiral spring L, acting against the collar M, operates to keep said sprocket-pinion in engagement with the clutch O, fixed to the axle J, the pulleys having corresponding clutch-teeth, as seen in Fig 1. A projection Q, carried by one of the beams of one of the hoes, serves to engage with the conical flange K, when such member is elevated in the manner hereinafter to appear, and thereby force the flange against the spring L and disengage the pinion I from the clutch O, so as to discontinue the rotation of the feeder-shaft. By this means such shaft is automatically stopped when the hoes are elevated. The flange might be operated to effect this disengagement by some means independent of the hoe-beam; but the latter is preferred. The main frame is mounted upon the axle J, and at or near the middle it is provided with a stout pole R, rigidly connected with the frame. To the forward end of this pole is pivotally connected a pole-extension S, plates T being bolted to the pole proper and pivoted at U to effect this connection. Thus it will be seen that the pole is jointed and no weight thrown upon the necks of the animals other than that of the pole-extension, so that no matter how large the machine may be the animals are not affected in this respect on that account.

The draft attachments are preferably connected with the pole proper, and consist of a whiffletree V, doubletrees W and X′, and singletrees Y, with a draft-equalizing bar Z, pivoted to the longer arm of the whiffletree and to one of the doubletrees. This latter doubletree is also pivoted to the pole proper. Stay-chains Y' are also preferably used. I have stated that the frame is mounted upon the axle J. This axle is carried by the wheels a, and is so located as to receive amply sufficient weight to cause the wheels to have enough traction to insure the operation of the parts. The remaining weight is sustained by the auxiliary wheels b, through their connecting-bars c, which are pivoted to brackets d, carried by the cross-bar D, and are supplied with yielding stops or springs e, coiled about the rods f, which are carried by the connecting-bars and guided in the projections g. It will be noticed from Fig. 1 that a wheel of this kind is secured at each end of the cross-bar D, as shown in full lines. This is the position of these wheels when they are merely to perform the function of auxiliary supporting-wheels, in which instance some suitable form of coverer—as, for instance, a ring and link coverer h—is used. The connection of the brackets d with the bars D is pivotal, so as to give the wheels b the quality of caster-wheels to facilitate the operation of turning. The springs e allow the wheels to yield to irregularities and to roll over slight obstructions without materially affecting the frame.

When it is desired to pack the soil firmly down upon the planted grain, the wheels b are set in, as indicated in dotted lines in Fig. 1, and one of such wheels is connected with the beam D behind each of the runners. In this case the wheels perform their former function of supporting the rear of the machine, as also the additional function of packing the soil, which is especially useful in those sections of the country which are subject to high wind storms and where the soil is light and easily uncovered by the action of the wind unless packed down. It will be noticed that the seat is so located and connected with the frame by a standard i and a brace j as to throw the weight of the operator upon these auxiliary wheels.

The runners k, with their hoes l and connecting-beams m, are of any approved type, but preferably in accordance with Letters Patent granted to P. P. Mast on June 11, 1889, No. 404,852, and assigned to my assignees of this invention, the P. P. Mast & Company, of Springfield, Ohio. These beams m are pivotally connected with the cross-bar B, and the hoes are fed through the tubes o and elevated and depressed through the rods p and springs q, carried by said rods. These rods are formed with eyes at their upper ends and hung on a shaft r, mounted in clips s, through crank-arms t. A lever v is connected to the shaft r and arranged to raise and lower the same on its crank-arms. A locking-segment w and a detent y are used to lock the lever in adjusted positions.

The rods p are held at proper distances apart by means of a spacer composed of a rod a', coiled at each end to form the eyes b', which fit around the shaft r, as seen in Figs. 2 and 4. This is a simple and effective device for spacing the rods on the shaft.

It will be understood that the runners are depressed to such a depth as particular circumstances may require and the grain fed into the furrow through the tubes o and the hoes l, and the covering effected by any form of coverer, as that shown at h, or the covering and packing effected by means of the auxiliary supporting-wheels already described.

I do not wish to be confined to the relative position of the main and auxiliary wheels shown and described, since one or the other, or both, may be placed at different positions with respect to each other and to the frame and still preserve the feature of supporting the frame, utilizing the one set of wheels as packers and admitting of the jointed pole. The flange K may be of the form illustrated in Fig. 5 at Q', and the projection P' formed with angular or inclined part to engage with the flange.

While I have illustrated and described the hoes as being mounted upon runners, it is obvious that the invention will not be departed from by the omission of the runners and the provision of the hoes of the usual or any approved points or shovels.

It will be understood from Fig. 1 that the outer auxiliary supporting-wheels may by reason of their location with respect to the frame be swung sidewise around it and toward the side of the frame in a forward direction, as may be occasioned by backing and turning.

Having thus fully described my invention, what I claim as new, and desire to secure by Letters Patent, is—

1. In a grain-drill, the combination, with the main frame, supporting-wheels having their axle connected to the frame near to the forward end thereof, and auxiliary supporting-wheels connected to the frame near the rear end thereof, of a hopper and feeding mechanism mounted upon the frame between the said sets of wheels, motion-transmitting mechanism receiving motion from the supporting-wheels and conveying it to the feeding-mechanism shaft and drilling devices, and means to adjust the same to and from the ground, and a pole connected to the main frame by a flexible joint.

2. In a grain-drill, the combination, with the main frame, feeding devices, and drilling devices carried thereby, the latter being adjustable to and from the ground, and means to effect such adjustment, of main supporting-wheels, and auxiliary supporting-wheels having also the function of packing the soil, such latter wheels being connected to the frame to follow each a drilling device.

3. In a grain-drill, the combination, with the main frame, forward supporting-wheels, and auxiliary supporting-wheels having the capacity of packing the soil and connected to the main frame on vertical pivots, of feeding and drilling devices in advance of the auxiliary wheels, and means to adjust the drilling devices to and from the ground.

4. In a grain-drill, the combination, with the main frame, of main supporting-wheels, substantially of the type shown, whereby they are adapted to run upon the ground generally as well as upon the fields, of auxiliary supporting-wheels connected to said frame and adapted to travel upon the ground generally as well as to pack the soil.

5. In a grain-drill, the combination, with the main frames having places for the connection of auxiliary wheels in and out of line with the drilling devices, of auxiliary supporting-wheels transferable from the places of connection in line to those out of line of the drilling devices, and vice versa.

6. In a grain-drill, the combination, with the main frame, the rear beam of which has a number of holes, some of which are in and some outside of the line of the drilling devices, of auxiliary supporting-wheels mounted upon pivots and transferable from said outside holes to others in line with the drilling devices, and vice versa.

7. In a grain-drill, the combination, with the main frame, of auxiliary supporting-wheels attached thereto at the rear corners thereof, and adapted to swing sidewise and toward the front of the machine, as occasioned in turning and backing.

8. In a grain-drill, the combination, with the lifting-bar and rods suspended therefrom, of spacing devices mounted upon said bar between said rods, and consisting of a wire formed into eyes at either end and a portion extending from eye to eye.

In testimony whereof I affix my signature in presence of two witnesses.

MARTIN L. KISSELL.

Witnesses:
C. C. KIRKPATRICK,
J. W. SPAHR.